(12) United States Patent
Lee

(10) Patent No.: US 9,474,086 B2
(45) Date of Patent: Oct. 18, 2016

(54) APPARATUS AND METHOD FOR SCHEDULING IN CONSIDERATION OF SERVICE CONNECTION TIME DURATION (SCTD) IN MOBILE COMMUNICATION SYSTEM

(75) Inventor: Seung-Hyun Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1156 days.

(21) Appl. No.: 12/187,893

(22) Filed: Aug. 7, 2008

(65) Prior Publication Data

US 2009/0040977 A1 Feb. 12, 2009

(30) Foreign Application Priority Data

Aug. 10, 2007 (KR) .................. 10-2007-0080435

(51) Int. Cl.
*H04W 72/12* (2009.01)
(52) U.S. Cl.
CPC ..... *H04W 72/1257* (2013.01); *H04W 72/1284* (2013.01)
(58) Field of Classification Search
None
See application file for complete search history.

(56) References Cited

U.S. PATENT DOCUMENTS

| 6,987,738 B2 | 1/2006 | Subramanian et al. |
| 6,993,343 B2 * | 1/2006 | Yoshii et al. ............. 455/452.1 |
| 7,145,895 B2 | 12/2006 | Mueckenheim et al. |
| 7,715,360 B2 * | 5/2010 | Chun et al. .................. 370/349 |
| 2006/0143444 A1 * | 6/2006 | Malkamaki et al. ......... 713/160 |
| 2006/0251079 A1 * | 11/2006 | Kwak et al. .................. 370/394 |
| 2006/0268822 A1 | 11/2006 | Chun et al. |

* cited by examiner

*Primary Examiner* — Alex Skripnikov
(74) *Attorney, Agent, or Firm* — The Farrell Law Firm, P.C.

(57) ABSTRACT

An apparatus and a method for scheduling in consideration of a Service Connection Time Duration (SCTD) in a mobile communication system. The apparatus includes a User Equipment (UE) for transmitting a Media Access Control (MAC) Protocol Data Unit (PDU) including an SCTD measured by counting a connection time to receive an uplink service through a high speed data transmission, and a Base Transceiver Station (BTS) for receiving the MAC PDU including the SCTD from the UE, allocating a priority by considering the SCTD, and allocating radio resources based on the priority.

10 Claims, 5 Drawing Sheets

APPARATUS AND METHOD FOR SCHEDULING IN CONSIDERATION OF SERVICE CONNECTION TIME DURATION (SCTD) IN MOBILE COMMUNICATION SYSTEM

PRIORITY

This application claims priority under 35 U.S.C. §119(a) to a Korean patent application filed in the Korean Intellectual Property Office on Aug. 10, 2007 and assigned Serial No. 2007-80435, the contents of which are incorporated herein by reference.

BACKGROUND OF THE INVENTION

1. Field of the Invention

The present invention relates generally to an apparatus and a method for scheduling in consideration of a service connection time duration in a mobile communication system, and more particularly to an apparatus and a method for allocating priority of terminals using a service connection time duration received from the terminals and scheduling based on the priority when a Base Transceiver Station (BTS) allocates resources for an uplink service.

2. Description of the Related Art

Mobile communication systems are advancing to Third-Generation (3G) mobile communication systems of high speed and high quality to provide data service and multimedia service, beyond the more rudimentary voice-oriented services. The 3G mobile communication system represents a mobile telecommunication that supports not only the voice service but also a packet service, and employs a Code Division Multiple Access (CDMA) scheme. The 3G mobile communication system includes $3^{rd}$ Generation Project Partnership (3GPP) or Universal Mobile Telecommunications System (UMTS) which is the standard in Europe and Japan based on asynchronization between the base transceiver stations (Node Bs), and 3GPP2 or CDMA2000 which is the standard in the United States of America, based on synchronization between Node Bs.

The 3G mobile communication system, which is divided into the asynchronous system (3GPP) and the synchronous system (3GPP2), is standardizing for a radio data packet service of high quality. For example, the 3GPP is standardizing High Speed Downlink Packet Access (HSDPA) and the 3GPP2 is standardizing 1×EV-DV, which proves the effort on a solution for the high-speed and high-quality radio packet delivery over 2 Mbps in the 3G mobile communication system.

The 3GPP also suggests the Enhanced Uplink Dedicated CHannel (EUDCH) to realize not only the rapid packet transmission from the BTS (Node B) to a User Equipment (UE) but also the radio packet transmission from the UE to the BTS.

The BTS schedules the uplink for the rapid packet transmission by receiving a MAC Protocol Data Unit (PDU) from the UE.

FIG. 1 illustrates a conventional structure of the MAC PDU. The MAC-e PDU 100 includes a plurality of MAC-es PDUs. A MAC header of the MAC-e PDU 100 includes a Data Description Indicator (DDI) 102, which is information relating to the MAC-es PDU, and Number of MAC-d PDUs (N) 104. The 6-bit DDI 102 represents a logical channel, a MAC-d flow, and a size of the MAC-d PDU. The 6-bit N 104 represents the number of consecutive MAC-d PDUs having the same DDI value.

When the MAC-e PDU 100 includes Scheduling Information (SI) 108 carrying scheduling information, the MAC header includes $DDI_0$ in 6-bit size of '11111' to inform of the SI in the MAC-e PDU 100.

The SI 108, which is the information for the scheduling of the BTS, represents an amount of system resource required by the UE using 18 bits. The SI 108 includes UE Power Headroom (UPH) 112, Total Enhanced Dedicated Channel (E-DCH) Buffer Status (TEBS) 114, Highest priority Logical channel Buffer Status (HLBS) 116, and Highest priority Logical channel ID (HLID) 118.

The 5-bit UPH 112 indicates a ratio or a DPCCH code power to a maximum transmit power of the UE, the 5-bit TEBS 114 indicates an amount of data of all logical channels mapped to the E-DCH, and the 4-bit HLBS 116 indicates an amount of data of the logical channel indicated by the HLID, and the 4-bit HLID 118 is an ID of the highest-priority logical channel among the data available in the buffer. More detailed descriptions about the MAC-e PDU of FIG. 1 are provided in the Specification "3GPP TS 25.321 (Release 6)".

The BTS differentiates the network resource allocation per UE using the SI 108 received from the UE. Particularly, the BTS preferentially schedules based on the HLID 118. That is, the BTS discriminates the resource allocation preferentially based on the service type. The UEs in the uplink service through the high-speed data transmission use almost the same service such as File Transfer Protocol (FTP) or Video On Demand (VOD). In the similar network environment, the UEs are assigned the equal scheduling weight from the BTS and are allocated similar network resources. Hence, when the resource reaches the limit because of a maximum amount of users in the uplink service through the high-speed data transmission, there is a problem in that the BTS is likely to equally schedule the UEs of the same service.

SUMMARY OF THE INVENTION

The present invention has been designed to address at least the above-mentioned problems and/or disadvantages and to provide at least the advantages described below. Accordingly, an aspect of the present invention is to provide an apparatus and a method for scheduling in consideration of a service connection time duration in a mobile communication system.

Another aspect of the present invention is to provide an apparatus and a method for allocating priority of UEs using a service connection time duration received from the UEs and scheduling based on the priority when a BTS allocates resources for an uplink service in a mobile communication system.

Another aspect of the present invention is to provide an apparatus and a method for a UE to be scheduled by a BTS in consideration of a service connection time duration after the UE in an uplink service measures and sends the service connection time duration in a mobile communication system.

Another aspect of the present invention is to provide a structure of a Media Access Control (MAC) Protocol Data Unit (PDU) including information relating to a service connection time duration to schedule based on the service connection time duration in a mobile communication system.

The above aspects are achieved by providing an apparatus for scheduling in consideration of a Service Connection Time Duration (SCTD) in a mobile communication system including a UE for transmitting a MAC PDU having an SCTD measured by counting a connection time to receive an uplink service through a high speed data transmission, and a BTS for receiving the MAC PDU having the SCTD from the UE, allocating a priority by considering the SCTD, and allocating radio resources based on the priority.

According to the present invention, a UE for receiving an uplink service in consideration of a SCTD includes an SI checker for checking SI indicative of an amount of system resource required by the UE, an SCTD checker for measuring the SCTD which is an uplink service time through a high speed data transmission, and a PDU generator for generating a MAC PDU having the SI and the SCTD, when detecting a MAC PDU generation event.

According to the present invention, a BTS for providing an uplink service in consideration of a SCTD includes an SI extractor for extracting SI by checking whether a received MAC PDU includes the SI, an SCTD extractor for extracting an SCTD by checking whether the received MAC PDU includes SCTD information, and a scheduler for scheduling a priority for an uplink service of a UE in consideration of the SI and the SCTD and allocating radio resources based on the priority.

According to the present invention, a method for a UE to receive an uplink service in consideration of a SCTD includes checking SI indicative of an amount of system resource required by the UE when detecting a MAC PDU generation event, measuring the SCTD which is an uplink service time through a high speed data transmission, and generating a MAC PDU including the SI and the SCTD.

According to the present invention, a method for a BTS to provide an uplink service in consideration of an SCTD includes extracting SI by checking whether a received MAC PDU includes the SI, extracting an SCTD by checking whether the received MAC PDU includes SCTD information, scheduling a priority for an uplink service of a UE in consideration of the extracted SI and the extracted SCTD, and allocating radio resources based on the priority.

Other aspects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF THE PREFERRED EMBODIMENTS

The following description with reference to the accompanying drawings is provided to assist in a comprehensive understanding of preferred embodiments of the present invention as defined by the claims and their equivalents. It includes various specific details to assist in that understanding but these are to be regarded as merely preferred. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Preferred embodiments of the present invention provide an apparatus and a method for allocating priority of UEs using a service connection time duration of the UEs and scheduling based on the priority when a BTS allocates resources for an uplink service in a mobile communication system.

Figure 1:
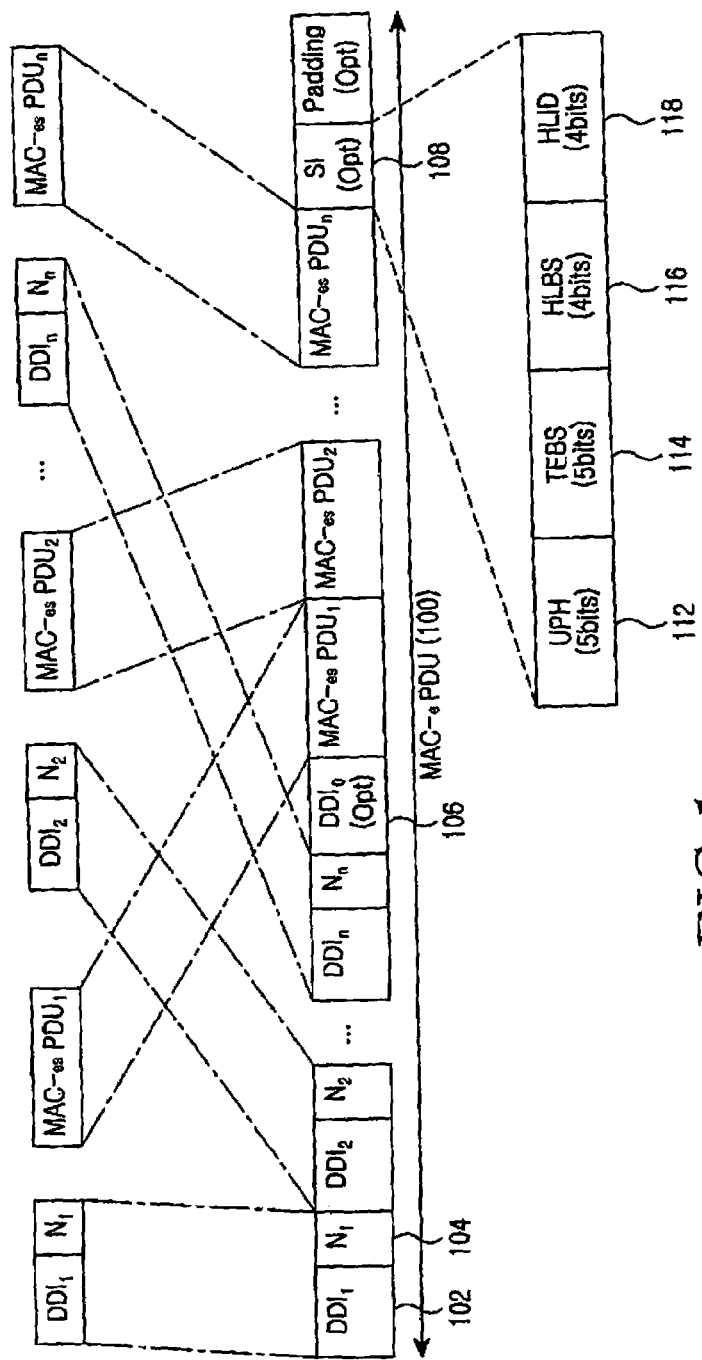
FIG. 1 illustrates a conventional structure of a MAC PDU.
Figure 2:
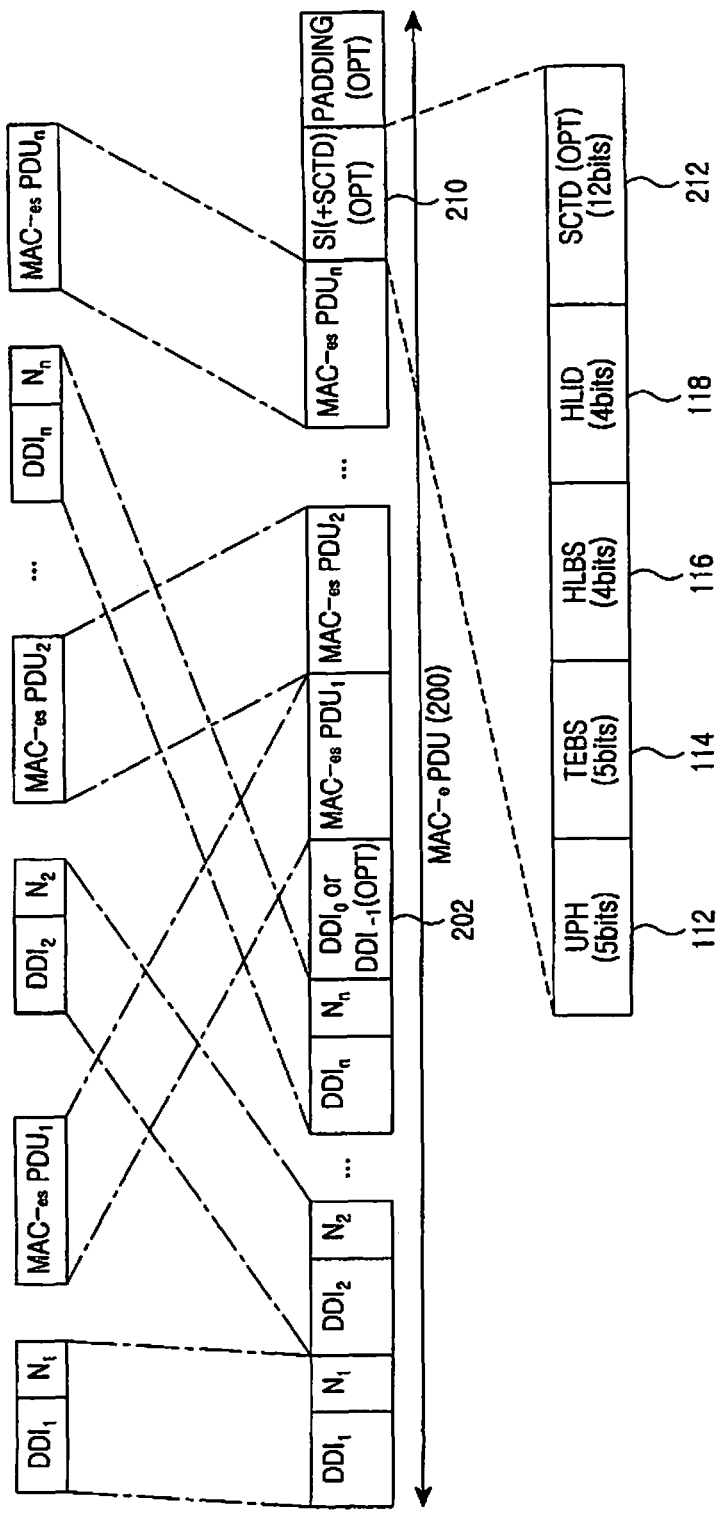
FIG. 2 illustrates a structure of a MAC PDU according to the present invention.

FIG. 2 illustrates a structure of the MAC PDU according to the present invention. A MAC header of a MAC-e PDU 200 includes a Data Description Indicator ($DDL_{-1}$) 202 of the value '111110' to indicate that the MAC-e PDU 200 includes SCTD information. Specifically, when the MAC-e PDU 200 includes the SCTD information, the MAC header uses $DDL_{-1}$ 202. When the MAC-e PDU 100 does not include the SCTD information but includes only SI 108, the MAC header uses $DDI_0$ 106.

In addition to the conventional UE Power Headroom (UPH) 112, Total E-DCH Buffer Status (TEBS) 114, Highest priority Logical channel Buffer Status (HLBS) 116 and Highest priority Logical channel ID (HLID) 118, the SI 210 of the present invention includes 12-bit SCTD information 212 indicative of uplink SCTD information of a UE.

Figure 3:
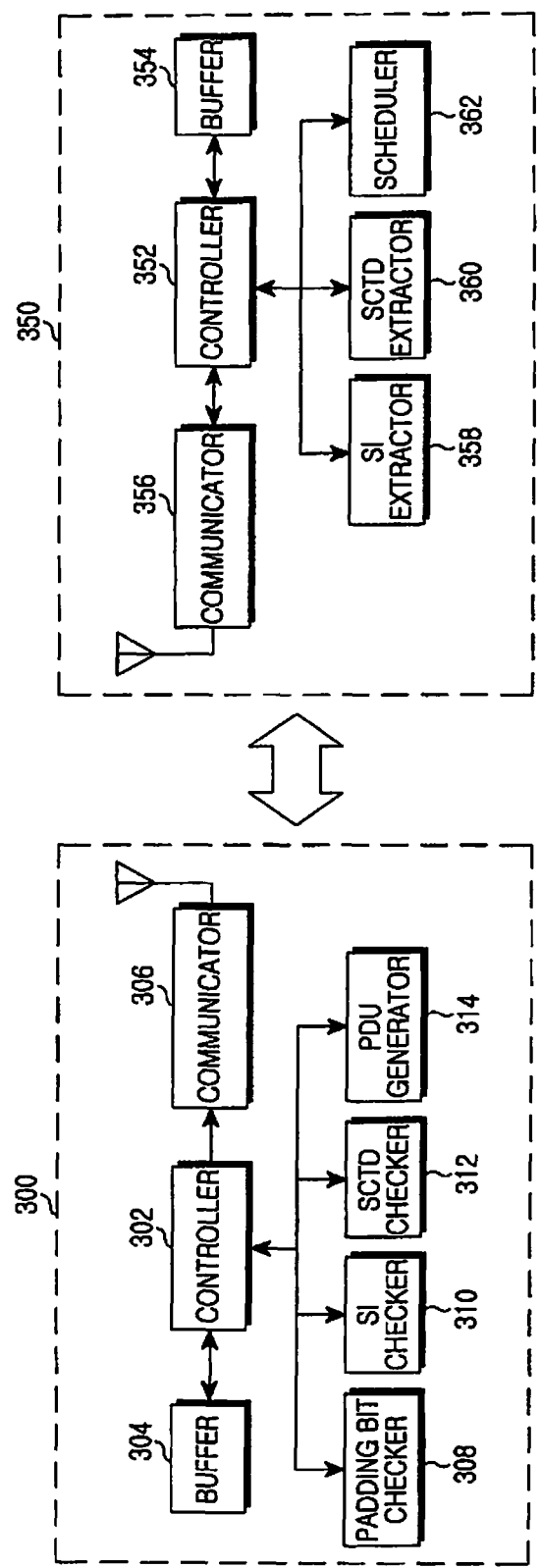
FIG. 3 illustrates a mobile communication system for scheduling an uplink service in consideration of a service connection time duration according to the present invention.

FIG. 3 illustrates a mobile communication system for scheduling an uplink service in consideration of a service connection time duration according to the present invention. The mobile communication system of FIG. 3 includes a UE 300 for transmitting a MAC PDU in the uplink service by including the service connection time duration, and a BTS 350 for scheduling based on the received SCTD upon receiving the MAC PDU including the SCTD.

The UE 300 includes a controller 302, a buffer 304, a communicator 306, a padding bit checker 308, an SI checker 310, an SCTD checker 312 and a PDU generator 314.

The buffer 304 temporarily stores data transmitted for the uplink service. In the reception, the communicator 306 down-converts a Radio Frequency (RF) signal received via an antenna, despreads and channel-decodes the received signal. In the transmission, the communicator 306 channel-codes and spreads data, up-converts the data and transmits the data via the antenna. In the uplink service, the communicator 306 transmits a MAC PDU generated at the PDU generator 314 to the BTS 350.

The padding bit checker 308 checks a size of padding bits, which pad a fixed-length block or an unused area of a record with specific information.

The SI checker 310 checks SI relating to the amount of system resource required by the UE 300 for the sake of the scheduling of the uplink service at the BTS 350. The SI is 18-bit information including UPH, TEBS, HLBS and HLID.

The SCTD checker 312 measures an SCTD which is the time taken for the UE 300 to communicate with the BTS 350 and to receive the uplink service through the rapid data transmission. The SCTD is 12 bits in size. The SCTD increases by 1 per 2560 ms. The countable time of the SCTD is up to about 3 hours. When the uplink service starts, the SCTD checker 312 generates the SCTD information. When a certain time elapses in the course of the uplink service, the SCTD checker 312 updates the SCTD information. When the uplink service ends, the SCTD checker 312 deletes the SCTD information.

The count of the SCTD in systems having different data rates is represented as shown in Table 1.

TABLE 1

| System type | Count |
| --- | --- |
| 10 ms TTI system | Increase by 1 per 256 × TTI (=2560 ms) starting from SCTD |
| 2 ms TTI system | Increase by 1 per 1280 × TTI (=2560 ms) starting from SCTD |
| 1 ms TTI system | Increase by 1 per 2560 × TTI (=2560 ms) starting from SCTD |

Upon detecting a MAC PDU generation event, the PDU generator 314 includes data to the MAC PDU through the padding bit checker 308 and checks a size of the padding bits which is a spare area. When the padding bits exceeds 36 bits; that is, when the padding bits can include all of the SI, the SCTD information, and the DDI informing of the use of the SCTD information, the PDU generator 314 includes the SI confirmed at the SI checker 310 and the SCTD information measured at the SCTD checker 312 into the MAC PDU, includes $DDI_{-1}$ informing that the MAC PDU includes the SI and the SCTD information into the MAC header, and then controls the communicator 306 to transmit the generated MAC PDU to the BTS 350. The structure of the MAC PDU is illustrated in FIG. 2.

By contrast, when the size of the padding bits confirmed at the padding bit checker 308 does not exceed 36 bits, the PDU generator 314 generates a MAC PDU in the conventional manner. More specifically, when the size of the padding bits is less than 18 bits, the PDU generator 314 generates a MAC PDU not including SI, SCTD information and DDI information. When the size of the padding bits is between 18 bits and 24 bits, the PDU generator 314 generates a MAC PDU including the SI. When the size of the padding bits is between 24 bits and 36 bits, the PDU generator 314 generates a MAC PDU including the SI and the $DDI_0$.

The controller 302 controls the padding bit checker 308, the SI checker 310, the SCTD checker 312 and the PDU generator 314. In other words, the controller 302 can function as the padding bit checker 308, the SI checker 310, the SCTD checker 312 and the PDU generator 314. Herein, the checkers are separately provided to distinguish their functions. In the actual implementation, the controller 302 may process all or part of the functions of the padding bit checker 308, the SI checker 310, the SCTD checker 312 and the PDU generator 314.

The BTS 350 includes a controller 352, a buffer 354, a communicator 356, an SI extractor 358, an SCTD extractor 360 and a scheduler 362.

The buffer 354 temporarily stores MAC PDUs received from the UEs. In the reception, the communicator 356 down-converts an RF signal received via an antenna, and despreads and channel-decodes the received signal. In the transmission, the communicator 356 channel-codes and spreads data, up-converts the data, and then transmits the data via the antenna. In the uplink service, the communicator 356 receives the MAC PDU including the SCTD information from the UE.

Upon receiving the MAC PDU from the UE through the communicator 356, the SI extractor 358 checks whether the received MAC PDU includes SI. When the MAC PDU includes the SI, the SI extractor 358 extracts the SI and provides the extracted SI to the scheduler 362.

The SCTD extractor 360 checks whether the received MAC PDU includes SCTD information. When the MAC PDU includes the SCTD information, the SCTD extractor 360 extracts and provides the SCTD to the scheduler 362.

The scheduler 362 schedules priority of the UEs for their uplink service and allocates radio resources based on the priority by considering the scheduling information of the UEs extracted at the SI extractor 358 and the SCTDs of the UEs extracted at the SCTD extractor 360. The scheduler 362 gives a high priority for the low SCTD and gives a low priority for the high SCTD.

The controller 352 controls and functions as the SI extractor 358, the SCTD extractor 360 and the scheduler 362, which are separately provided to distinguish their functions. In the actual implementations, the controller 352 may process all or part of the functions of the SI extractor 358, the SCTD extractor 360 and the scheduler 362.

Figure 4:
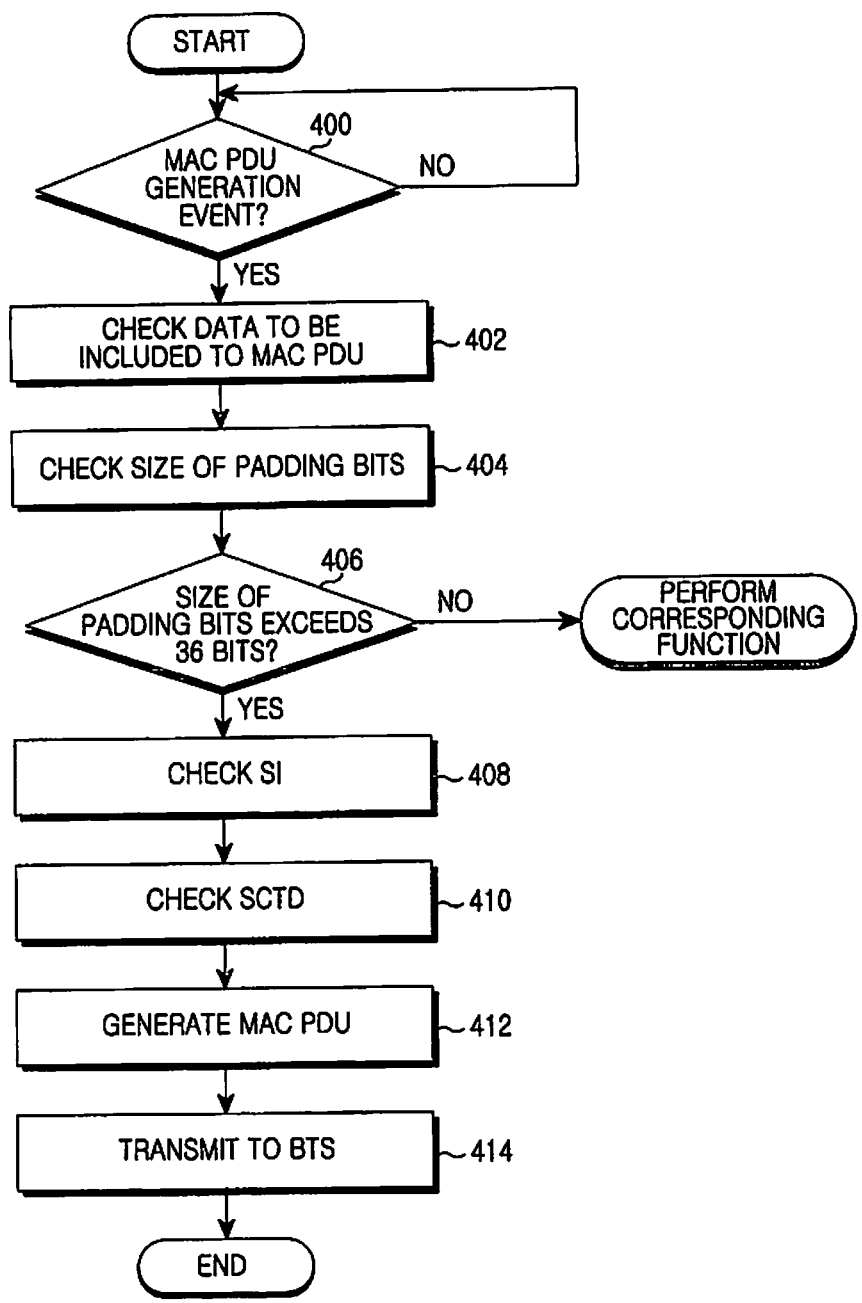
FIG. 4 illustrates a method for a UE to be scheduled in an uplink service in consideration of the service connection time duration according to the present invention.

FIG. 4 is a flowchart illustrating a method for a UE to be scheduled in an uplink service in consideration of the service connection time duration according to the present invention. When detecting a MAC PDU generation event in step 400, the UE checks data to be included to the MAC PDU in step 402, checks the size of the padding bits which is a spare area after including the data of the MAC PDU in step 404, and checks whether the padding bits exceed 36 bits in step 406. When the size of the padding bits is less than 36 bits in step 406, the UE generates a MAC PDU in the conventional manner.

When the size of the padding bits exceeds 36 bits in step 406, the UE checks SI represented using the UPH, the TEBS, the HLBS and the HLID in step 408, and checks the SCTD in step 410. The SCTD is 12 bits in size and measured by increasing by 1 at time intervals (e.g., per 2560 ms) starting from the service connection. In step 412, the UE includes the SI and the SCTD information to the MAC PDU and includes $DDI_{-1}$ informing of the SI and the SCTD information to the header of the MAC PDU. In step 414, the UE transmits the generated MAC PDU to the BTS.

Figure 5:
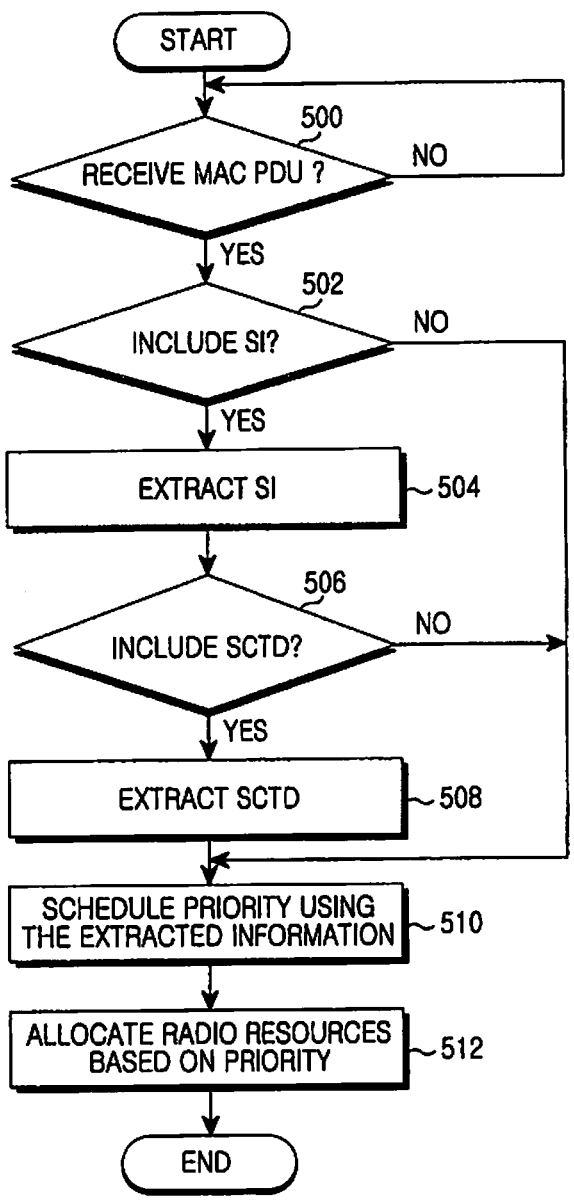
FIG. 5 illustrates a method for a BTS to schedule in consideration of the service connection time duration according to the present invention.

FIG. 5 illustrates a method for a BTS to schedule in consideration of the SCTD according to the present invention.

When receiving the MAC PDU from the UE in step 500, the BTS checks whether the received MAC PDU includes SI in step 502. When the SI is not included, the procedure goes to step 510.

When the MAC PDU includes the SI in step 502, the BTS extracts the SI from the received MAC PDU in step 504 and checks whether the received MAC PDU includes SCTD information in step 506. When no SCTD information is included, the procedure goes to step 510.

When the SCTD information is included, the BTS extracts the SCTD from the received MAC PDU in step 508, and schedules the priority of the uplink service of the UE by considering the extracted SI and the SCTD in step 510, and then allocates radio resources based on the priority in step 512.

In step 510, the BTS gives a high priority to the low SCTD and gives a low priority to a high SCTD.

As set forth above, in the mobile communication system, the UE transmits the MAC PDU including the SCTD which counts the connection time to receive the downlink service through the high speed data transmission, and the BTS receives the MAC PDU including the SCTD information from the UE, allocates the priority based on the SCTD, and schedules to allocate the radio resources based on the priority. Therefore, users can be serviced with a fair priority based on the SCTD.

While the present invention has been shown and described with reference to certain preferred embodiments thereof, it will be understood by those skilled in the art that various changes in form and details may be made therein without departing from the spirit and scope of the present invention as defined by the appended claims and their equivalents.

What is claimed is:

1. A Base Transceiver Station (BTS) for providing an uplink service, comprising:
   a transceiver configured to receive a Media Access Control (MAC) Protocol Data Unit (PDU) comprising scheduling information (SI) and a data description indicator (DDI), from a user equipment (UE); and
   a controller configured to:
      control to extract the SI and the DDI by checking whether the received MAC PDU includes the SI and the DDI,
      control to extract service connection time duration (SCTD) information, which indicates an amount of time measured while the UE is provided a first uplink service through a rapid data transmission, by checking whether the received MAC PDU includes the SCTD information based on the DDI,
      determine a priority for a second uplink service for the UE, which is different from the first uplink service, in consideration of the SI and the SCTD information, and
      allocate radio resources for the second uplink service based on the priority.

2. The BTS of claim 1, wherein the DDI comprises information indicating whether the SCTD information is included in the SI.

3. The BTS of claim 1, wherein the controller gives a high priority to a low SCTD and gives a low priority to a high SCTD.

4. The BTS of claim 1, wherein the SI comprises UE Power Headroom (UPH), Total Enhanced Dedicated Channel (E-DCH) Buffer Status (TEBS), Highest priority Logical channel Buffer Status (HLBS) and Highest priority Logical channel ID (HLID).

5. The BTS of claim 1, wherein the SCTD information is 12-bit information, which is increased by 1 at time intervals in the first uplink service.

6. A method for a Base Transceiver Station (BTS) to provide an uplink service, the method comprising:
   receiving a Media Access Control (MAC) Protocol Data Unit (PDU) comprising scheduling information (SI) and a data description indicator (DDI), from a user equipment (UE);
   extracting the DDI by checking if the received MAC PDU includes the SI and the DDI;
   extracting service connection time duration (SCTD) information, which indicates an amount of time measured while the UE is provided a first uplink service through a rapid data transmission, by checking if the received MAC PDU includes the SCTD information based on the DDI;
   determining a priority for a second uplink service for the UE, which is different from the first uplink service, in consideration of the SI and the SCTD information; and
   allocating radio resources for the second uplink service based on the priority.

7. The method of claim 6, wherein the DDI comprises information indicating whether the SCTD information is included in the SI.

8. The method of claim 6, wherein the determining of the priority gives a high priority to a low SCTD and gives a low priority to a high SCTD.

9. The method of claim 6, wherein the SI comprises UE Power Headroom (UPH), Total Enhanced Dedicated Channel (E-DCH) Buffer Status (TEBS), Highest priority Logical channel Buffer Status (HLBS) and Highest priority Logical channel ID (HLID).

10. The method of claim 6, wherein the SCTD information is 12-bit information, which is increased by 1 at time intervals in the first uplink service.

* * * * *